(12) United States Patent
Pirs et al.

(10) Patent No.: US 8,026,998 B2
(45) Date of Patent: Sep. 27, 2011

(54) VARIABLE CONTRAST, WIDE VIEWING ANGLE LIQUID CRYSTAL LIGHT ATTENUATION FILTER

(75) Inventors: Janez Pirs, Ljubijana (SI); Silvija Pirs, Ljubljana (SI); Bojan Marin, Ljubljana (SI); Andrej Vrecko, Ponikva (SI)

(73) Assignee: Institut Josef Stefan (SI)

( * ) Notice: Subject to any disclaimer, the term of this patent is extended or adjusted under 35 U.S.C. 154(b) by 803 days.

(21) Appl. No.: 11/920,323

(22) PCT Filed: May 9, 2006

(86) PCT No.: PCT/EP2006/004336
§ 371 (c)(1),
(2), (4) Date: Nov. 13, 2007

(87) PCT Pub. No.: WO2006/122679
PCT Pub. Date: Nov. 23, 2006

(65) Prior Publication Data
US 2009/0066882 A1    Mar. 12, 2009

(30) Foreign Application Priority Data
May 20, 2005    (SI) .................................... 200500147

(51) Int. Cl.
*G02F 1/1335* (2006.01)
(52) U.S. Cl. .......................................... 349/96; 349/101
(58) Field of Classification Search ........................ None
See application file for complete search history.

(56) References Cited

U.S. PATENT DOCUMENTS
4,039,254 A    8/1977   Harsch ......................... 350/160
(Continued)

FOREIGN PATENT DOCUMENTS
DE    37 21 751 AI    1/1989
(Continued)

OTHER PUBLICATIONS
Vrecko et al: "*High Contrast Wide-Viewing Angle LCD Light Filter*" Dig. Tech. Pap. SID Int. Symp.; Digest of Technical Papers—SID International Symposium; 2005; pp. 164-167, XP002393043.
(Continued)

*Primary Examiner* — Lucy Chien
(74) *Attorney, Agent, or Firm* — Renner Kenner Greive Bobak Taylor & Weber

(57) ABSTRACT

A new concept of the LCD light-switching optical filter allowing for very high, electrically controlled, continuously variable light attenuation (up to $\geq 100.000$) optimized/symmetrized for the light incidence along the normal to the LCD plane is proposed. The new LCD light-switching optical filter also exhibits very low light attenuation dependence for the oblique incidence of light within a limited cone of angles off the normal incidence direction in compliance with the international safety and quality regulation EN 379 for personal protection equipment.
According to the invention the problem is solved by specific, novel modification of the general principle of highly twisted nematic LCDs, allowing for the adaptation of the light transmission/driving voltage characteristics to specific requirements of the driving electronics as well as "symmetrizing" the overall optical birefringent properties, which in turn results in a high degree of their angular compensation.

12 Claims, 7 Drawing Sheets

U.S. PATENT DOCUMENTS

| | | | |
|---|---|---|---|
| 4,696,548 A * | 9/1987 | Ueno et al. | 349/195 |
| 5,249,071 A * | 9/1993 | Yoshimizu et al. | 349/102 |
| 5,515,186 A | 5/1996 | Fergason et al. | 359/53 |
| 5,940,155 A | 8/1999 | Yang et al. | 349/120 |

FOREIGN PATENT DOCUMENTS

| | | |
|---|---|---|
| WO | WO 95/29428 | 11/1995 |
| WO | WO 97/15254 | 5/1997 |
| WO | WO 97/15255 | 5/1997 |
| WO | WO 2004/102265 | 11/2004 |
| WO | WO 2006/102265 | 11/2004 |

OTHER PUBLICATIONS

Palmer, Steven: "*Optical Angular Properties of Twisted-Netnatic Liquid-Crystal Cells With Twist Angles of Less Than 90 °•*" Applied Optics; May 1, 1996; vol. 25, No. 13.

\* cited by examiner

VARIABLE CONTRAST, WIDE VIEWING ANGLE LIQUID CRYSTAL LIGHT ATTENUATION FILTER

TECHNICAL FIELD OF THE INVENTION

The invention relates to high contrast, wide viewing angle Liquid Crystal Display (LCD) light switching filters optimized for specific requirements in particularly encountered in eye protection applications (recommendation and requirements of EN 379, . . . ) as well as to their manufacturing and operational concept.

The technical field of the present invention is the field of LCD light-switching optical filters allowing for high, electrically continuously variable light attenuation (up to $\geq 100.000$) optimized/symmetrized for the light incidence along the normal to the LCD plane and requiring that a light blocking be effective even, when light travels through the light-switching filters within a limited cone of angles off the normal incidence direction (– see for example international safety and quality regulation EN 379 for personal protection optical devices).

Such light-switching optical filters are used in particular for applications in human eye protection (for example: welding protective filters), in stereovision and specialized optical devices. Since the LCD light filters are typically autonomous, battery powered devices, the performances such as the accuracy of the light attenuation in the optically closed (eye protective) state as well as the overall power consumption of the driving electronics strongly depend on the light transmission/voltage characteristics of the LCD light filters and its optimization is essential for achieving the state-of-the-art performances.

The above requirements are significantly different from the angular dependence issue in the technical field of LCD screens for laptop computers, monitors and TV, where rather moderate light contrasts are required and the symmetry of the light attenuation around the normal to the LCD plane is not so important (best viewing angle), while the limit of the viewing angle is typically determined as the angle of the gray scale inversion.

BACKGROUND OF THE INVENTION

The fundamentals of the above mentioned problems are well understood, because the origin of these problems is very similar to the well-known "viewing angle" problem found in Liquid Crystal Displays (LCDs) in general. Because of the very large impact of the viewing angle problem, found in liquid crystal displays (LCDs) of laptop computers and TV, worldwide interest in this problem has led to a number of solutions.

It has to be emphasized that active light filters, based on LCD light shutters are very specialized LCD products typically used for eye protection and stereovision devices. As such they are subject to noticeably different technical requirements, as found with typical LCD display applications. A point to be emphasized here is, that due to the voltage limitations, that exist for picture elements in the multiplex addressed LCD screens of lap-top computers and TV, as well as the overall user requirements for these display panels, the developed technical solutions did not lead to the desired performance and cost target for a shutter device, that has to be used for example in the personal protection devices. In the case of a shutter device for personal eye-protection applications (e.g.: welding glasses, . . . ), the drive voltage can be two to four times that of a LCD for a lap-top computer, and it is much more critical, that very high light attenuations are reached and the off-normal axis light extinction properties of the device are excellent.

The automatic LCD active light filters in their "optically closed" state (—eye protection!) usually operate in a "dark scale" regime (light attenuation $\geq 10$), quite often even as two state devices in optically fully open and highly "optically closed state" (—the major issue of the presented patent application). They typically require very high light attenuation, which can be realized only with more than one (2 or even 3) LCD light shutters joint in the final protective device. Having more than one LCD light shutter in a device, significantly affects the overall problem of the angular dependence of the light attenuation as well as its symmetry around the normal to the LCD plane.

The most typical examples of stacked LCDs are found with automatic LCD light switching filters for personal protection applications in welding, where light attenuation exceeding 100.000 is required. So Harsch et al (U.S. Pat. No. 4,039,254) and Reisacher at all (DE 3721751) teach that stacking at least two standard Twist Nematic (TN) LCD (90° twist) light shutters in tandem provides the light attenuation, as required for eye protection in welding applications. None of them however discloses the advantage of the choice of the "complementary TN LCD light shutters" (complementary viewing angles), which can improve and symmetrize the overall viewing angle of the LCD welding filter.

Significantly more detailed analysis is provided in the patents of A. Hornell (WO 97/15254, WO97/15255, and WO95/29428) and in the publication by S. Palmer et al (Appl. Optics, 35, 13, (1996)). They teach that stacking two Low Twist Nematic (<90 degrees) cells (LTN LCD) provides adequate light attenuation. They further teach that the LCD cells and the adjacent crossed polarizers are mutually oriented in such a way that the polarizers are aligned exactly along the bisectrices of the LC alignment directions in both LCD cells—a solution already introduced before by Young et all (U.S. Pat. No. 5,940,155). The authors also teach that a positive-birefringent layer having its optic axis oriented in the plane of the LCD light filter is used to reduce the residual retardation of the LC cell in the optically closed state in order to reduce the driving voltage necessary for achieving high light attenuation.

The use of a different LCD technology (Pi-cell), exhibiting a significantly better angular symmetry than the above mentioned "TN and LTN solutions" is introduced for automatic LCD light filters by Fergason et al (U.S. Pat. No. 5,515,186) from OSD Envision. They teach that stacking at least two Pi-cells in a tandem provides adequate light attenuation. With the difference from the above-mentioned Hornell's patents (LTN technology) the polarizers are not aligned along the bisectrices of the LC alignment directions on the boundaries of the LCD cells. The authors also claim the use of positive-birefringent layers, having their optic axis oriented in the plane of the LCD light filter and perpendicularly to the LC-molecular alignment. Such an additional element is necessary in order to compensate for the residual birefringence of the Pi-cell in the optically closed state so that the driving voltage necessary for achieving the required high light attenuation is reduced to acceptable value. The authors also propose the specific relative orientation of the LCD cells to improve the overall angular dependence of the LCD light switching filter and even introduce the use of additional in-plane (LCD) quarter-wave plate to increase this possibility.

None of the above mentioned patents discloses the use of a negative-birefringent layer with the optic axis oriented along the normal to the LCD light filter plane (negative-birefringent c-plate) to correct for the positive birefringence of the homeotropically aligned LC molecules in the "optically closed" state of the LCD light switching filter—the major source of the annoying high angular dependence of the light attenuation of the LCD light filters. They also do not mention the use of "complementary constructed LC-cells" stacked in a tandem in order to further reduce the angular dependence of the LCD light filters. Finally none of the above mentioned technical solutions mentions nor allows a "specific optimization" (other than standard LCD panel solutions) of the LCD cell parameters (like LC-molecular orientation twist angles, relative orientation of the polarizing films with respect to the LC-molecular alignment, . . . ) to get the required value and slope of the light transmission/voltage characteristics. Since the LCD light filters are typically autonomous, battery powered devices, the performances of the driving electronics are rather limited by the possible choice of batteries. The accuracy of the adjustment of the light attenuation and especially the overall power consumption therefore strongly depend on the light transmission/voltage characteristics of the LCD light filters.

SUMMARY OF THE INVENTION

The object of the present invention is to provide a LCD light-switching optical filter allowing for very high, electrically controlled, continuously variable light attenuation (up to $\geq 100.000$) optimized/symmetrized for the light incidence along the normal to the LCD plane.

High contrast and wide viewing angle in the optically closed state (eye protective state) are achieved with the LCD light switching filter according to claim 1. Advantageous embodiments of this filter are subject matter of the subclaims.

The proposed light switching filter comprises two electrically controlled optical birefringent elements—LC-cells LCD1, LCD2, two mutually crossed pairs of polarizing films (polarizer P, analyzer A) $P_1$, $A_1$ and $P_2$, $A_2$, adjacent to the light input and output sides of the said LC-cells LCD1, LCD2, as shown for example on the FIGS. 9*a*, *b*, each of the said LC-cells LCD1, LCD2 using a thin layer of liquid crystal molecules oriented in a highly twisted configuration (twist angles $\Phi$ from 120 to 240 degrees) enclosed between two boundary glass plates 1$a^a$, 1$a^b$, the said plates 1$a^a$, 1$a^b$ being on the inner side covered by transparent electrodes 1$b^a$, 1$b^b$ and alignment layers 1$c^a$, 1$c^b$, as shown for example on the FIG. 1. The whole assembly optionally has additional negative-birefringent compensating layers R1, R2 protective cover glass C and "photopic" filter PF reflecting harmful IR an UV light.

Key features of the proposed invention and/or its advantageous embodiments are the highly twisted Liquid Crystal (LC) molecular orientation of the LCD light shutter, its operation in the "low-slope regime LS" of the light transmission/driving voltage characteristics (FIG. 3) and the complementary dual LC-cell configuration of the LCD light switching filter (FIGS. 9*a*, *b*). The resulting overall symmetry of the proposed LCD light switching filter allows for very high, continuously electrically variable optical attenuation, as well as efficient angular compensation using just simple, low cost negative-birefringent c-plate retarders. The proposed technical solutions according to the invention noticeably improve the overall optical performances of the LCD light-switching filters, which significantly exceed the highest requirements of the international safety standards (i.e.: EN 379, . . . ) for eye protection devices:

a. High level of light attenuation (up to $\geq 100.000$) in the "optically closed" state of the filter b. Precision continuous electrical adjustment of the light attenuation of the filter c. Optimization for the light incidence along the normal to the LCD light filter plane, d. Compensation for the angular dependence of light attenuation, e. High switching speed.

The above features represent the most essential performance requirements for the automatic LCD light switching filters for eye protection applications. According to the invention they are very efficiently realized using LCD light shutters based on the standard STN technology optimized according to the following concept—Highly Twisted Light Shutter—HTLS:

Ad a. Since the required high level of light attenuation can be achieved only by using two LCD light shutters in a tandem, relatively low light attenuations (45-350) are required for each of them to cover the entire protective range, as required by international standards like EN 379. So relatively low light attenuation typically achieved with STN LCDs is not a problem. Moreover, higher driving electric fields, necessary for achieving the same light attenuation as the standard TN LCD light shutters, as well as the overall HTLS operational concept, result in noticeably better homeotropic alignment of the LC molecules in the optically closed state than with the conventional TN or LTN technologies (see FIG. 7). This property can be very efficiently used to help compensating for the angular dependence of the light attenuation (see Ad d for details).

Ad b. The most contradicting requirement seems to be the precision continuous adjustment of the light attenuation, as the light transmission/voltage characteristic of the STN LCD is generally believed to be a lot steeper than with TN or LTN technologies. This is however true only for the relatively low light attenuation, while for the higher attenuation ($\geq 45$) the slope of the light transmission/driving voltage V characteristics levels off (see FIG. 3) and is typically few times smaller because of the unbalanced residual retardation of the thin boundary LC molecular layers $d^a$, $d^b$, where the surface interactions compete with the driving electric field (see FIG. 1). The limiting minimum driving voltage amplitude $V_{LS}$ for the "low-slope regime" ($V \geq V_{LS}$; see FIG. 3) depends on the twist angle $\Phi$ and so does the overall slope of the light transmission/driving voltage characteristics (FIG. 4). This property of the STN LCDs has never been considered to be important, as the said STN LCDs were developed with only high information content LCD panels in mind, where the driving voltage V is varied in the high-slope regime of the light transmission/driving voltage characteristics (FIG. 3) from the switching threshold voltage $V_{th}$ to a limiting voltage $V_{LS}$ for the onset of the low-slope regime ($V_{th} \leq V \leq V_{LS}$). With highly twisted LCD light shutters according to the invention (HTLS), used in LCD light switching filters for personal protection applications the LC molecular twist angle $\Phi$ is not the only technical parameter affecting the light transmission/voltage characteristic. Besides the LC molecular twist angle $\Phi$ the said characteristics is also controlled by the chiral doping (see FIG. 6) of the liquid crystal ($d^a + d^b + e$) and/or by the relative angle $\alpha$ between the crossed polarizers and the LC-alignment (FIG. 5; see also Ad c.). The light attenuation required for the LCD light switching filters for personal protection applications is typically (e.g. welding) in the range from ~4000 to $\geq 100.000$. With variable protective shade LCD light switching filters the light transmission in the optically closed (protection) state is therefore adjusted in the "dark scale" (higher light attenuation) rather than in the "gray scale" regime typical for the computer or TV terminals. In view of this one can optimize one, two or all three technical parameters specified above (FIGS. 4, 5 and 6) to achieve that the light transmission of the LCD light switching filter is adjustable only within the higher driving voltage, "low-slope" regime ($V \geq V_{LS}$), as shown in the FIG. 3. Furthermore the said three technical parameters allow for adjusting the LCD light switching filter performances to optimally fit the available maximum driving voltage V amplitude span of the particular electronic driving circuitry, which is typically strongly limited by the batteries used to power the said circuitry.

Ad c. The light attenuation of highly twisted LCD light shutters (HTLS) in the optically closed state can exhibit reasonably good symmetry around the normal to the LCD plane provided that the crossed polarizers are aligned along the symmetry axes (for example for the first LC cell: $S^1{}_1, S^2{}_1$) of the LC alignment directions (for example for the first LC cell: $1r^a, 1r^b$) on the boundary plates of the LCD light shutter (FIG. 2). This symmetry can be optionally further improved by using "complementary" structure of both LCD light shutters in the LCD light switching filter:

LC alignment rotated for 90°
the output polarizer $A_1$ of the first LCD light shutter LCD1—parallel to the input polarizer $P_2$ of the second LCD light shutter LCD2
all other parameters—identical.

Such a dual "complementary" LCD construction of the filter makes the constraint for the crossed polarizers $P_1, A_1$ adjacent to the first LC-cell LCD1 and for the crossed polarizers $P_2, A_2$ adjacent to the second LC-cell LCD2 being aligned along the symmetry axes $S'_1$ and $S^2{}_1$ of the LC alignment directions of the first LCD1 respectively along the symmetry axes $S^1{}_2$ and $S^2{}_2$ the second LC-cell LCD2 less strict, as the angular dependencies of the light transmission of said two complementary LC-cells compensate each other. The use of a tandem of complementary LC-cells therefore allows for some rotation of the crossed pairs of polarizers $P_1, A_1$ and $P_2, A_2$ for a relative angle α away from the said ideal orientations (FIG. 2). The light transmission/driving voltage characteristics noticeably depends on the relative angle α between the crossed polarizers $P_1, A_1$ respectively $P_2, A_2$ and the symmetry axes $S^1{}_1, S^2{}_1$ respectively $S^1{}_2, S^2{}_2$ (see FIG. 5). Therefore the said angle α can be further used to optimize the overall absolute value of the light transmission characteristics and broaden the interval LS for the "dark scale" operation of the LCD light switching filters as well as to broaden the overall viewing angle of the LCD light switching filter in the optically closed state.

Ad d. The dual "complementary" HTLS construction significantly simplifies the problem of angular compensation of the light attenuation in the optically closed state of the LCD light switching filter. Besides the superior angular independence of the light attenuation as compared to standard TN or LTN solutions, which results from the high symmetry of the LC-molecular orientation in the HTLS construction, the viewing angle can be further expanded by optimizing the relative angle α between the crossed polarizers $P_1, A_1$ and $P_2, A_2$ and the LC alignment $1r^a, 1r^b$ and $2r^a, 2r^b$ (see also the Detailed description). Finally as already mentioned (Ad a) HTLS concept exhibits increased homeotropic alignment (see FIG. 7), which can be very efficiently compensated by the addition of only a simple negative-birefringent c-plate layers $R_1$ respectively $R_2$ built-in between the two LC-cells LCD1 respectively LCD2 and the adjacent crossed polarizers $P_1, A_1$ respectively $P_2, A_2$ (claim 8). A combination of all these effects results in a very appropriate overall angular compensation of the light attenuation, which is in complete compliance with the highest demands of the international standards like EN 379. The excellent angular dependence (see FIG. 8) for the optimized value of the additional negative-birefringent c-plate layers R1 respectively R2 results from the fact that the relative positioning of the said negative-birefringent c-plate layers R1 respectively R2 according to this patent application (claims 9, 10, 11), allows not only for compensating the angular dependence of the homeotropically oriented central part e of the LC molecular layer (see FIG. 1) with both LC-cells LCD1 and LCD2 but also for a great deal of the angular dependence of the crossed polarizers $P_1, A_1$ and $P_2, A_2$ adjacent to the LC-cells LCD1 and LCD2. The said additional compensation effect can be achieved, if the effective "negative-retardation" of the said negative-birefringent c-plate layers R1 respectively R2 is deliberately chosen to be smaller than the effective "positive-retardation" of the homeotropically oriented central LC-molecular layer e (see FIG. 1). The resulting positive-birefringence having the optic axis aligned along the normal to the LC-cell ("c-plate"), if combined with the residual in-plane ("a-plate") positive-birefringence of the boundary LC-molecular layers $d^a, d^b$ can result in a rather efficient compensation of the angular dependence of the crossed polarizers $P_1, A_1$ and $P_2, A_2$ adjacent to the LC-cells LCD1 and LCD2.

Ad e. Switching speed of the order of 100 μs, as desired for efficient eye-safety protection, can be only achieved, if very high (typically $10^5$ V/cm) driving electric pulses are applied at the beginning of the switching request. At these voltages there is hardly any difference between either one of the LCD technologies used—the STN technology is as good as any.

To Summarize:

The proposed "HTLS concept", assuming twisting of the LC-molecular ordering through the LC-cells LCD1 and LCD2 well beyond 90°, optionally using a dual "complementary" LC-cell filter structure and rotating the crossed polarizers away from the symmetry axes between the LC-molecular alignment directions at the LC-cell boundaries, provides an additional optical symmetry essential for the low angular dependence of the light attenuation. Optimization of the molecular twist angle, chiral dopant concentration and the angle between the polarizers and the symmetry axes of the LC alignment directions at the LC-cell boundaries further results in the "ideal" electrooptic response and in the expansion of the viewing angle, which remains preserved through a broad range of driving voltages. Obtained high overall optical symmetry allows for the additional compensation of the LC cells with just simple, negative-birefringent c-plate retarders. The said retarders besides being low cost and easy to be tuned to specific LCD cells also have superior optical properties (WO 00/77561 A2) compared to the more sophisticated retardation films widely used in the computer and TV industry. "HTLS concept" therefore results in noticeably improved performances of the high optical contrast LCD light switching filters, which significantly exceed the highest requirements of the international safety standards [i.e. EN 379, . . . ] for eye protection devices without increase of the production cost or complexity.

A point to be emphasized here is that the LC-cell technical parameters as obtained according to the above described HTLS concept are noticeably different from the standard technical parameters used with standard STN LCD information panels. The latter are with STN LCDs optimized for multiplex driving in the high-slope regime of operation (FIG. 3). Therefore the polarizing films have to be aligned along the symmetry axes of the LC-molecular alignment and the highest technically possible LC-molecular twist angles Φ are used (typically ~240°) as opposed to the HTLS principle, where lower twist angles Φ are significantly more favorable (typically 225°). Chiral doping of the LC with STN LCDs has to be carefully adjusted (fixed) to avoid the stripe instabilities and backflow effects, while this is not the case with the HTLS principle since the LC-cells operate at higher driving voltages (low-slope regime LS) and the chiral doping can be used for optimizing the light transmission/voltage characteristics of the LCD light-switching filter.

DESCRIPTION OF DRAWINGS

This invention may be better understood and its objectives and advantages will become apparent to those skilled in the art by reference to the annexed drawings as follows.

DETAILED DESCRIPTION

Figure 1A:
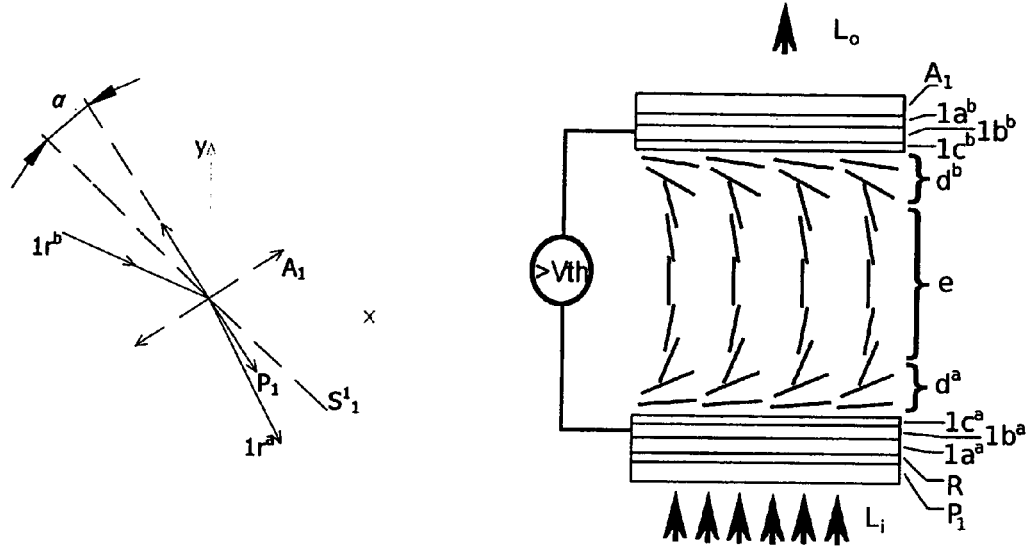
FIG. 1—Schematic presentation of the structure of HTLS optionally angularly compensated by an additional negative-birefringent layer R1, positioned accordingly to the relative orientation of the light input polarizing film and LC molecular alignment, showing in a separate picture the specific polarizing film and LC-molecular orientation in the optically closed state of the first LC-cell LCD1:
  a. Situation when the light input polarizer $P_1$ is parallel to the symmetry axis $S^1_1$ through the acute angle between the LC-molecular alignment directions $1r^a$, $1r^b$ of the first LC-cell LCD1
  b. Situation when the light input polarizer $P_1$ is perpendicular to the symmetry axis $S^1_1$ through the acute angle between the LC-molecular alignment directions $1r^a$, $1r^b$ of the first LC-cell LCD1
Figure 1B:
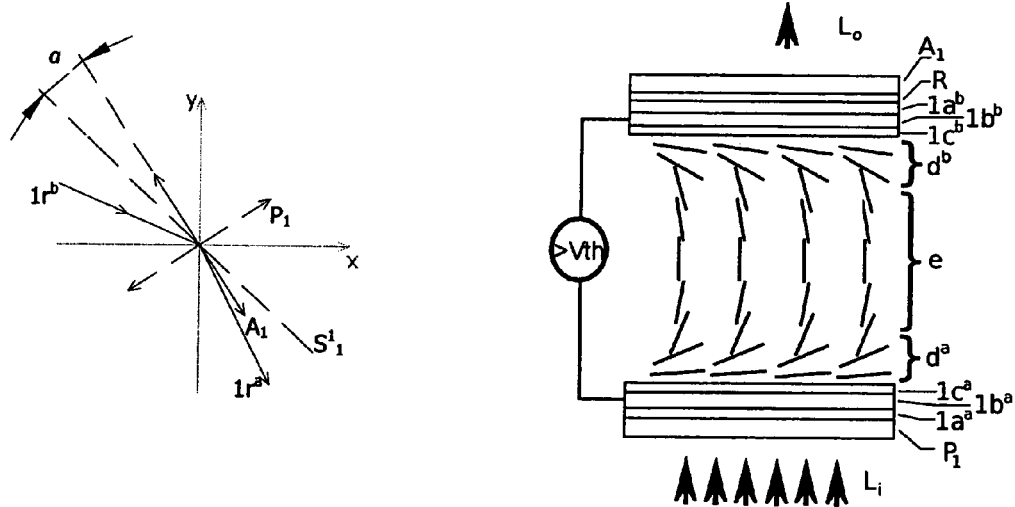

The objective of the present invention is a concept of the LCD light-switching optical filter allowing for very high, electrically controlled, continuously variable light attenuation (tip to ≧100.000) optimized/symmetrized for the light incidence along the normal to the LCD plane. At the same time the new LCD light-switching optical filter has to exhibit very low light attenuation dependence for the oblique incidence of light within a limited cone of angles off the normal incidence direction (preferably ≧15°—see international safety and quality regulation EN 379 for personal protection optical devices).

According to the invention the problem is solved by specific, novel modification of the general principle of highly twisted nematic LCDs, allowing for "symmetrizing" the overall birefringent properties, which in term results in their angular compensation. In the following exemplary embodiments of the invention are described in detail using FIGS. 1-9 without limiting the scope of the claims.

High contrast and wide viewing angle in the optically closed state of the LCD light switching filters are achieved using a multilayer laminate comprising two electrically controlled optical birefringent elements—LC-cells LCD1, LCD2, two mutually crossed pairs of polarizing films $P_1$, $A_1$ and $P_2$, $A_2$, adjacent to the light input and output sides of the said LC-cells LCD1, LCD2, each of the said LC-cells LCD1, LCD2 using a thin layer of liquid crystal molecules oriented in a highly twisted configuration (twist angles Φ from 120 to 240 degrees) enclosed between two boundary glass plates $1a^a$, $1a^b$, the said plates $1a^a$, $1a^b$ being on the inner side covered by transparent electrodes $1b^a$, $1b^b$ and alignment layers $1c^a$, $1c^b$, as shown on the FIG. 1. Optionally the LC-cells LCD1 respectively LCD2 have additional negative-birefringent compensating layers R1, R2 laminated between them and the adjacent polarizing films $P_1$, $A_1$ respectively $P_2$, $A_2$ in order to further improve the overall optical properties. The block diagram of such LCD light switching filter is shown on the FIGS. 9a, b.

As already pointed out before, the highly-twisted LC molecular structure has important advantages for optical light shutter applications (HTLS) as required for LCD light switching filters both from the light transmission/driving voltage characteristics (paragraph #1) as well as overall optical (paragraph #2) performances point of view:

1. A pronounced dual slope light transmission/driving voltage characteristics (FIG. 3), which is typical for highly twisted LC structures, as opposed to the standard TN LCD concept (twist angle 90 degrees), turns out to be ideal for light shutter applications. The latter typically operate as "two-state" devices in optically "fully open" and "highly closed" state. For many high performance applications (i.e. eye protection in welding, . . . ) the light attenuation in the optically closed regime however has to be more precisely adjusted to a particular application and therefore further continuous adjustment of the protective "shade" (i.e. EN 379 regulation) is necessary. The adjustments of the light attenuation are therefore done in the "dark scale" rather than in the "gray scale" regime, as found with typical display applications. The low-slope regime of operation LS (FIG. 3) of highly twisted LC structures, turns out to be ideal for continuous light attenuation control. The LCD light switching filter operating according to the HTLS concept however has to be adapted to allow for the entire span of the required protective shades to be adjustable within the low slope regime LS. This means that the driving voltage V, applied in the optically closed state to the LC molecular layer $d^a+d^b+e$ via the transparent ITO electrodes $1b^a$ and $1b^b$ on the inner side of the light input and light output LC-cell LCD1 boundary glass plates $1a^a$, $1a^b$, is always greater than $V_{LS}$ (see FIG. 3). In view of this the LC molecular twist angle should be different from 180° for an angle +/−δ as the LC-cells with LC-molecular twist angles Φ~180° cannot provide enough light transmission variation only within the low slope regime LS. From the twist angle dependence of the light transmission/driving voltage characteristics shown in the FIG. 3 it is evident that the said angle δ is preferably bigger than 20 degrees. On the other side the maximum value of the said angle δ is limited to ~60 degrees by the loss of optical symmetry as well as the overall stability of the highly twisted LC molecular orientation.

There are three technical parameters that can be used to optimize the light transmission/driving voltage characteristics of the LCD light switching filters operating according to the proposed HTLS concept:

1.1. Twist angle Φ of the LC molecular layer $d^a+d^b+e$ structure (see FIG. 4)
1.2. Relative orientation (angle α) of the crossed polarizing films $P_1$, $A_1$ and the symmetry axes $S^1_1$, $S^2_1$ of the LC-molecular alignment surface directions $1r^a$, $1r^b$ in the LC-cell LCD1 (see FIG. 5)
1.3. Chiral doping of the LC molecular layer $d^a+d^b+e$ (see FIG. 6)

Figure 4:
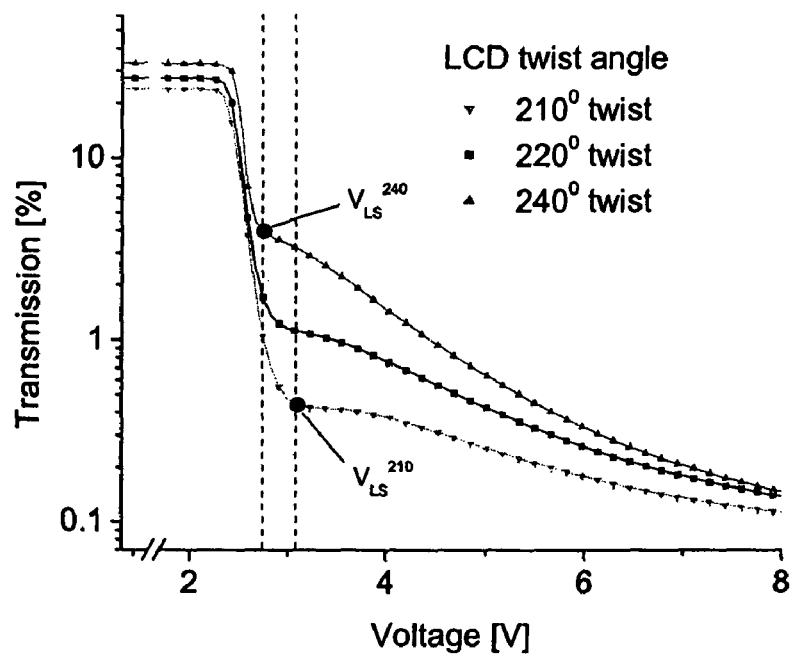
Figure 5:
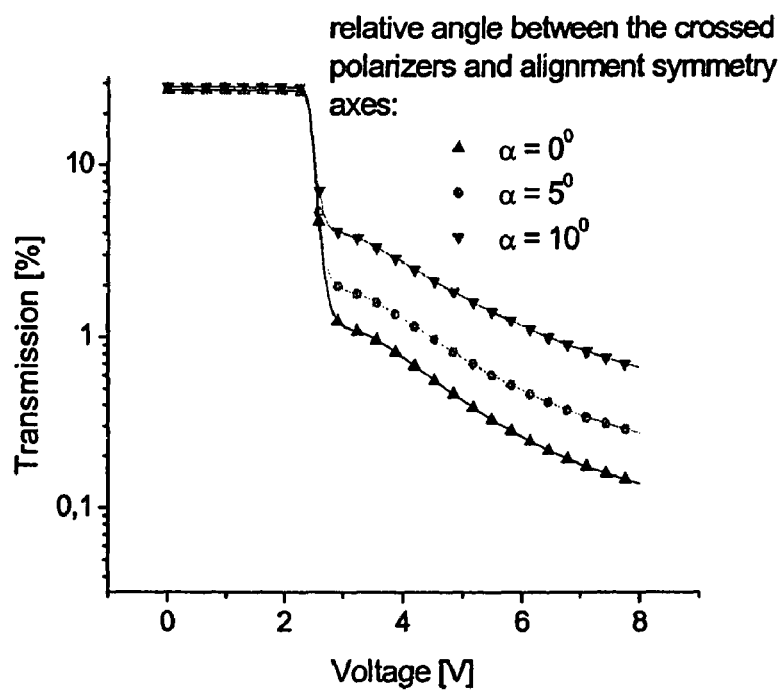

In the following the above features are explained using the FIGS. 1 through 6 for one LC-cell LCD1. It is however understood that the same explanation can be used also for the second LC-cell LCD 2, which together with the LC-cell LCD1 forms the LCD light switching filter:

Ad 1.1. From the dependence of the light transmission/driving voltage characteristics on the molecular twist angle Φ between the molecular alignment directions $1r^a$ on the light input and $1r^b$ on the light output boundary layers $1a^a$, $1b^a$, $1c^a$ respectively $1a^b$, $1b^b$, $1c^b$ of the LC cell LCD1 (see FIG. 1a) it is evident that the twist angle Φ strongly affects the slope of the said characteristics (FIG. 4). It is also shown that the limiting value $V_{LS}$ for the onset of the "low slope" regime LS (FIG. 3) varies with different values of ($V_{LS}^{240}$, $V_{LS}^{210}$—FIG. 4)—the most sensitive HTLS technical parameter.

Figure 2:
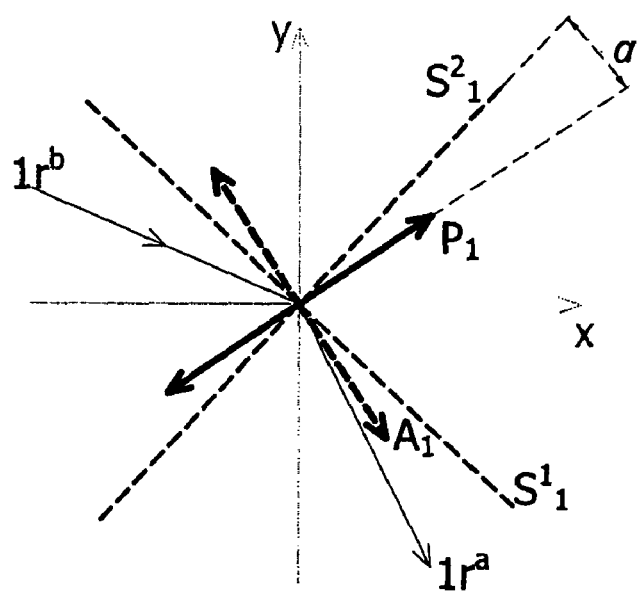
FIG. 2—Relative orientation of the symmetry axes of the top and bottom LC cell alignment directions and crossed polarizers FIG. 3—Typical light transmission/driving voltage characteristics of the HTLS FIG. 4—LC twist-angle dependence of the light transmission/driving voltage characteristics FIG. 5—Effect of the relative orientation of the 220°-twisted cell and crossed polarizers on the transmission/driving voltage characteristic of the HTLS light filter FIG. 6—Effect of the chiral doping of the LC on the light transmission/driving voltage characteristic of the HTLS light filter FIG. 7—Computer modeling of the nematic LC director field at the light attenuation 320 for standard TN and 220°-twisted LCD light shutter through the LC-molecular layer FIG. 8—Angular dependence of the light attenuation with HTLS (b) and standard TN LCD light shutter (a)
Figure 3:
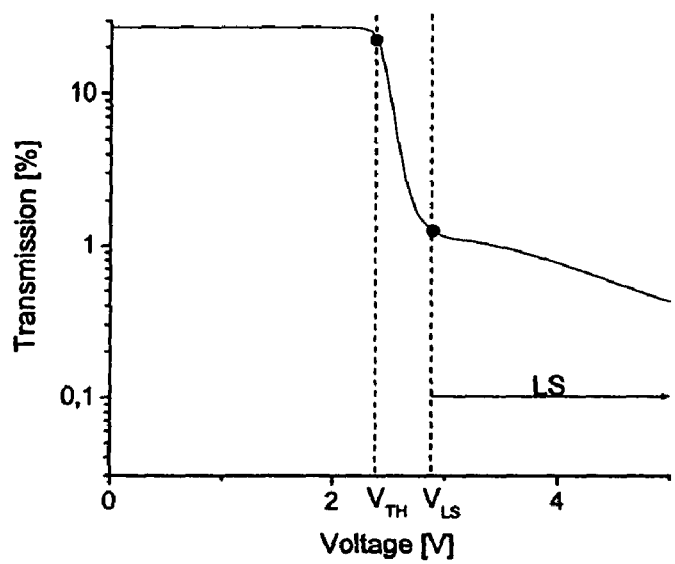

Ad 1.2. The relative orientation of the crossed polarizing films $P_1$, $A_1$ and the symmetry axes $S^1_1$, $S^2_1$ of the LC-molecular alignment surface directions $1r^a$, $1r^b$ in the LC-cell LCD1, as shown on the FIGS. 1 and 2, is the next most sensitive HTLS technical parameter. The light transmission/driving voltage characteristics for various relative angles α (0°, 5°, 10°) shown in the FIG. 5 demonstrates that the angle α between the light transmission directions of the crossed polarizing films $P_1$, $A_1$ and the symmetry axes $S^1_1$, $S^2_1$ of the LC-molecular alignment surface directions $1r^a$, $1r^b$ strongly affects the absolute value of the light attenuation.

Figure 6:
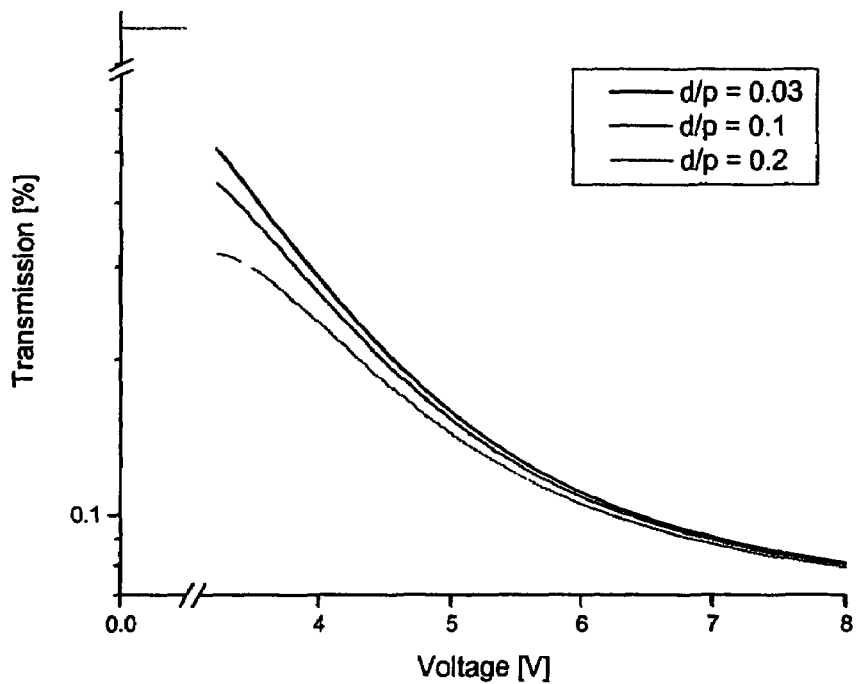

Ad 1.3. The chiral doping of the liquid crystal $d^a+d^b+e$ also affects the light transmission/driving voltage characteristics. The FIG. 6 shows the said characteristics for various values of chiral doping, where the latter is specified as the ratio d/p, where d is the thickness of the LC-cell LCD1 (typically 4-5 μm) and p is the length of the chiral pitch of the LC molecular structure induced by the chiral dopant (typically ~7 μm to 100 μm). It is obvious that the chiral doping can be also used to some extent to adapt the light transmission/driving voltage characteristics for the specific requirements of the driving electronics.

A point to be emphasized here is that the LCD light switching filters are typically autonomous, battery powered devices. Therefore the performances such as the accuracy of the light attenuation in the optically closed (eye protective) state as well as the overall power consumption of the driving electronics strongly depend on the light transmission/voltage characteristics of the LCD light filters. Optimization of the said characteristics is therefore essential for achieving the state-of-the-art performances. As described above, the HTLS concept provides three technical parameters (Φ, α, d/p) allowing for a precise adaptation of the light transmission/driving voltage characteristics—an important advantage which is not possible with standard TN or Pi-cell technologies.

2. The highly twisted LC molecular configuration in combination with the use of a dual "complementary" LC-cell filter structure (to be discussed in detail later—paragraph #3) and rotation of the crossed polarizing films away from the symmetry axes between the LC-molecular alignment directions at the LC-cell boundaries for a small angle α, provides an additional optical symmetry essential for the low angular dependence of the light attenuation.

In the following the above features are explained using the FIGS. 1 and 2 for one LC-cell LCD1 only. It is however understood that the same explanation can be used also for the second LC-cell LCD 2, which together with the LC-cell LCD1 forms the LCD light switching filter:

The LC-cells LCD1 and LCD2 are made out of standard alkaline float glass covered with typically 40 nm thick transparent ITO electrically conductive layer widely used in the LCD industry. The LC-cells LCD1 and LCD2 are filled standard commercially available nematic liquid crystal. The highly twisted LC-molecular structure (twist angles Φ from 120 to 240 degrees) of the LC-molecular layer $d^a+d^b+e$ in the LC-cell LCD1 is obtained by doping the said nematic liquid crystal with adequate amount (0.05≦d/p≦0.7) of the chiral dopant. The LC-molecules in the said LC-molecular layer $d^a+d^b+e$ are further aligned by means of the polymer (typically polyimide) alignment layers $1c^a$, $1c^b$ on the conductive ITO layers $1b^a$, $1b^b$ covering the inner sides of the light input and output boundary glass plates $1a^a$ and $1a^b$ so that the alignment directions $1r^a$, $1r^b$ of the said polymer alignment layers $1c^a$, $1c^b$ make an angle Φ with respect to each other (see FIG. 1a).

The required symmetry of the light attenuation around the normal to the LC-cell LCD1 is obtained by aligning the crossed polarizing films $P_1$, $A_1$ adjacent to the outer sides of the light input and output boundary glass plates $1a^a$ and $1a^b$ of the LC-cell LCD1 along the symmetry axes $S^1_1$, $S^2_1$ of the LC-molecular alignment surface directions $1r^a$, $1r^b$ (see FIG. 2). Since the final product—LCD light switching filter employs two LC-cells LCD1 and LCD2 in order to be able to provide enough light attenuation, the crossed polarizing films $P_1$, $A_1$ can be shifted for a small angle α away from the said ideal orientations along the symmetry axes $S^1_1$, $S^2_1$, as the configurations of the two LC-cells LCD1 and LCD2 can be chosen such that the two LC-cells LCD1 and LCD2 compensate the optical properties of each other. Rotating the crossed polarizing films $P_1$, $A_1$ away from the ideal directions of the LC alignment symmetry axes $S^1_1$, $S^2_1$, however shifts the maximum light attenuation away from the normal to the LC-cell LCD1 plane. With a proper choice of the second LC-cell LCD2 configuration (to be described later—paragraph #3) such a shift of the angular distribution of the light attenuation results in broadening of the viewing angle of the LCD light-switching filter.

The driving voltage V necessary for achieving the specific light attenuation is typically higher with highly twisted LC structures than with standard TN LCDs. Rotation of the crossed polarizing films $P_1$, $A_1$ away from the said ideal directions of the LC alignment symmetry axes $S^1_1$, $S^2_1$ further increases the required amplitude of the driving voltage V. Therefore with the LC-cells, built according to the HTLS concept, the LC-molecular layer $d^a+d^b+e$ is subjected to noticeably higher driving voltage V, which in turn results in significantly better homeotropic alignment of the LC molecules in the optically closed state. The said advantage of the HTLS over the standard TN concept is evident from the FIG. 7 showing computer modeling of the azimuthal angle θ (characteristic for the homeotropic orientation) of the LC director field through the LC-cell from one boundary plane to the other in the optically closed state (light attenuation 320) for the HTLS and TN LC-cell concept.

Figure 7:
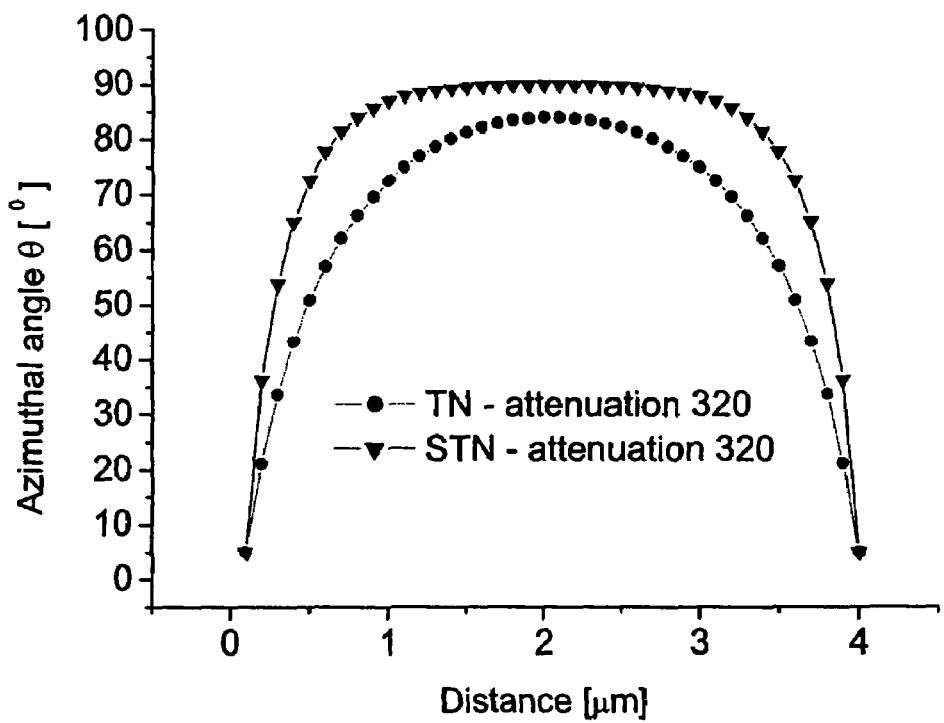

As shown in the FIG. 7 the HTLS concept exhibits reasonably good homeotropic LC molecular alignment through the entire dark-scale variation, as required for adequate eye protection in the optically closed state of the LCD light switching filter (protective shades 9 through 13 according to the international EN 379 safety regulation). This property allows for the efficient angular compensation of the LC-cell LCD1 with just a simple additional negative-birefringent layer R1, the optic axis of which is perpendicular to the LC-cell LCD1 plane. The said negative birefringent layer R1 besides being low cost, easy to manufacture and easy to be tuned to the specific LC-cell, also allows for some superior optical properties (lower light scattering, significantly higher light attenuation, . . . ) compared to the more sophisticated retardation films widely used in the computer and TV industry.

In order to compensate for the angular dependence of the optically birefringent layers (LC-molecular layer, polarizing films, compensating negative-birefringent layer) forming the LCD light switching filter one has to "match" the positive-birefringent properties of the homeotropically aligned central layer of liquid crystal e (see FIG. 1a and FIG. 7) and the inherently negatively-birefringent polarizing films $P_1$, $A_1$ with the compensating negative-birefringent layer R1. The said layer R1 must have the optic axis perpendicular to the LC-cell LCD1 plane and has to be incorporated between the boundary glass plates $1a^a$, $1a^b$ of the LC-cell LCD1 and the adjacent polarizing film $P_1$ or $A_1$. The birefringent optical properties of the said birefringent layers depend on the difference Δn between the refractive indices of the ordinary and extraordinary light ray in the said birefringent layers and their thickness d. In the explanation the following notations will be used: $\Delta n_e^+$ and $d_e^+$—difference of the refractive indexes and layer thickness of the homeotropically aligned part of the LC-molecular layer e, $\Delta n_p^-$ and $d_p^-$-difference of the refractive indexes and layer thickness of the polarizing films $P_1$, $A_1$, $\Delta n_R^-$ and $d_R^-$—difference of the refractive indexes and the layer thickness of the negative-birefringent layer R1:

2.1. In the first approximation the absolute value of the negative optical retardation $(\Delta n_R^- \times d_R^-)$ of the said negative birefringent layer R1 is chosen to be equal to the difference between the absolute value of the positive optical retardation $(\Delta n_e^+ \times d_e^+)$ of the homeotropically aligned part of the liquid crystal molecular layer e and the absolute value of the negative optical retardation $(\Delta n_p^- \times d_p^-)$ of the polarizing films $P_1$, $A_1$. In this case only the major contribution to the angular dependence originating from the ~homeotropically aligned central part of the LC-molecular layer e is compensated, while the angular dependence of the crossed polarizing films and the thin LC-molecular layers $d^a+d^b$ at both boundary surfaces $1c^a$, $1c^b$ remain uncompensated.

2.2. The HTLS structure in the optically closed state exhibits rather high effective residual positive-birefringence in the plane of the LC-cell LCD1, as opposed to the standard TN LCD, where the said effective residual positive birefringence cancels out in the first approximation. The existence of the said residual positive-birefringence in the plane of the LC-cell LCD1 allows also for a higher order of angular compensation using tunable negative-birefringent layer R1:

The relative positioning of the negative-birefringent layer R1 between the LC-cell LCD1 and the adjacent polarizing films $P_1$, $A_1$ is in principle not arbitrary. A simple qualitative evaluation of the optics of such LCD light switching filter using "Poin-Care sphere" concept shows that one can make advantage of the rather high effective residual positive-birefringence of the thin boundary LC layers $d^a+d^b$ to compensate for the angular dependence of the crossed polarizing films. In combination with a positive-birefringent layer having its optic axis perpendicular to the LC-cell plane the said residual birefringence can help reducing the angular dependence of the light attenuation of the crossed polarizing films $P_1$ and $A_1$. The computer modeling of the HTLS LC-cell as described above using GNU LCM-2 modeling software, shows that the value of the effective residual positive-birefringence of the thin boundary LC layers $d^a+d^b$ (≈80 nm of effective optical retardation) is not sufficient (about 40% too small) for the complete compensation. However even as it is, it can still strongly improve the said angular dependence of the light attenuation of the crossed polarizing films $P_1$ and $A_1$. Instead of adding the above mentioned additional positive-birefringent layer, one can simply "under-compensate" the positive birefringence of the central homeotropically aligned LC layer e, as compared to the condition specified in the preceding paragraph (2.1.) and the resulting overall positive-birefringence can do the job. The whole situation on this level of approximation is rather complex and only the computer modeling can provide a reliable estimate. It shows that any value of "under-compensation" from 100 to 300 nm will significantly improve the overall angular dependence of the LCD light switching filter. The measurements of the angular dependence of the light attenuation for the standard dual complementary TN LCD cell (a) and the negative-birefringent compensation layers compensated dual HTLS LC-cells (b) shown on the FIG. 8 confirm this prediction. The scale on the figure is drawn according to the EN 379 regulation—horizontal lines represent the limit of the "quality class I and all the regulations are specified for the light incident angles within +/−15 degrees. It is obvious that the results for the dual HTLS LC-cell light switching filter compensated according to the above concept using the negative-birefringent layer are an order of magnitude better than with the present state-of-the-art products.

As mentioned above the relative positioning of the negative-birefringent compensation layer is not anymore arbitrary in order to be able to use the above concept—the positioning of the negative-birefringent compensation layer R1 depends on the relative orientation of the input polarized light (light input $L_i$ polarizing film $P_1$) with respect to the LC-molecular alignment:

2.2.1. If the light input $L_i$ polarizing film $P_1$ is parallel with the symmetry axis $S_1^{\ 1}$ through the acute angle between the LC alignment directions $1r^a$, $1r^b$ (FIG. 1a) then the negative-birefringent compensation layer R1 has to be built-in between the light input $L_i$ polarizing film $P_1$ and the adjacent light input $L_i$ boundary glass plate $1a^a$ of the LC-cell LCD1—see FIG. 1a (the situation used in claims 9, 11)

2.2.2. If the light input $L_i$ polarizing film $P_1$ is perpendicular to the symmetry axis $S_1^{\ 1}$ through the acute angle between the LC alignment directions $1r^a$, $1r^b$ (FIG. 1b, FIG. 2) then the negative-birefringent compensation layer R1 has to be built-in between the light output $L_o$ polarizing film $A_1$ and the adjacent light output $L_o$ boundary glass plate $1a^b$ of the LC-cell LCD1—see FIG. 1b (the situation used in claims 10, 11).

The detail construction of the above described negative-birefringent layer compensated dual HTLS LC-cell light switching filter is given in the example at the end of this description.

3. All the above discussed principles of angular compensation of the optical performances are based on the fact that high light attenuation requirements, require the use of two LC-cells in the LCD light-switching filter design. Since these two LC-cells can be constructed such that their optical properties compensate each other to a great deal, just a reasonable improvement of the optical properties of each one of them can result in exceptional performances for the very specific "niche" application. In the case of the LCD light switching filters for eye protection applications the concept of the construction of the "complementary" HTLS LC-cells is rather straightforward. The second LC-cell LCD2 has to fulfill the following requirements in order to be complementary to the first LC-cell LCD1 of the LCD light switching filter:

3.1. LC alignment directions $1r^a$, $1r^b$ in the first LC-cell LCD1 have to be perpendicular within a small angle β to the LC alignment directions $2r^a$, $2r^b$ in the second LC-cell LCD2

3.2. Output light polarizing film $A_1$ adjacent to the light output $L_o$ boundary glass plate lab of the first LC-cell LCD1 has to be parallel within a small angle β to the light input $L_i$ polarizing film $P_2$ adjacent to the light input $L_i$ boundary glass plate $1a^a$ of the second LC-cell LCD2

3.3. All other parameters have to be as identical as possible. The small "misalignment" angle β between the LC-alignment directions $1r^a$, $1r^b$ as well as the polarizing films $P_1$, $A_1$ of the first LC-cell LCD1 and the LC-alignment directions $2r^a$, $2r^b$ as well as the polarizing films $P_2$, $A_2$ of the second LC-cell LCD2 needs a further comment. The fact is that from the practical, manufacturing point of view (ease of cutting of the polarizing foils, LC-alignment directions, pretilt of the LC molecules on the alignment surface) it may turn out that the symmetry of the viewing angle would not coincide with the geometry of the LCD light filter. In order to correct for this, the crossed polarizing films $P_1$, $A_1$ and $P_2$, $A_2$, adjacent to the light input and output sides of the said LC-cells LCD1, LCD2 can be laminated to the two LC-cells so that the light output $L_o$ polarizing film $A_1$ laminated on the first LC-cell LCD1 is not perfectly aligned with the light input $L_i$ polarizing film $P_2$ on the second LC-cell LCD2. As long as the said misalignment angle β is reasonably small (<20°) the light loss due to such a misalignment is negligible, however some additional symmetry of the light attenuation correlated with the overall geometry of the LCD light switching filter can be gained.

The use of the proposed HTLS technical solution can be best demonstrated by its application in the automatic LCD light switching filter for eye protection in various welding and plasma cutting applications. Typical working embodiment is described in the Example and illustrated in the FIGS. 8, 9a and *b* as follows:

Example

The above described HTLS concept for automatic LCD light filters is in particularly ideal for eye protection in welding applications. Personal protective devices like this have to comply with the international safety regulations like EN 379, ICNIRP "Guidelines on limits of exposure to broadband incoherent optical radiations", . . . . Therefore they have to allow for the adjustment of the protective "shade" in the optically closed (protective) state in a rather broad range from ~4000 up to ≧100.000 times. Furthermore they also have to protect the user not only against strong visible light flashes but also against excessive incoherent light in the invisible but harmful UV and IR light spectrum causing permanent damage to the human eye. The electro-optically active LCD light shutters cannot fulfill the above requirements only by themselves, as they are based on the use of polarizing films, which are developed to be efficient more or less only in the visible light spectrum—an additional protection against invisible UV and IR light is necessary. Since one is dealing with relatively high intensity light sources, this additional protection is preferably achieved by a filter, exhibiting selective reflection rather than absorption in the IR and UV spectral range, while being transparent in the visible spectral range, simulating more or less the eye sensitivity curve—"~photopic filter". Such an additional passive selective "mirror" furthermore guarantees permanent eye protection irrespective of the potential malfunctioning of the active LCD light filtering in the visible spectrum.

Figure 9A:
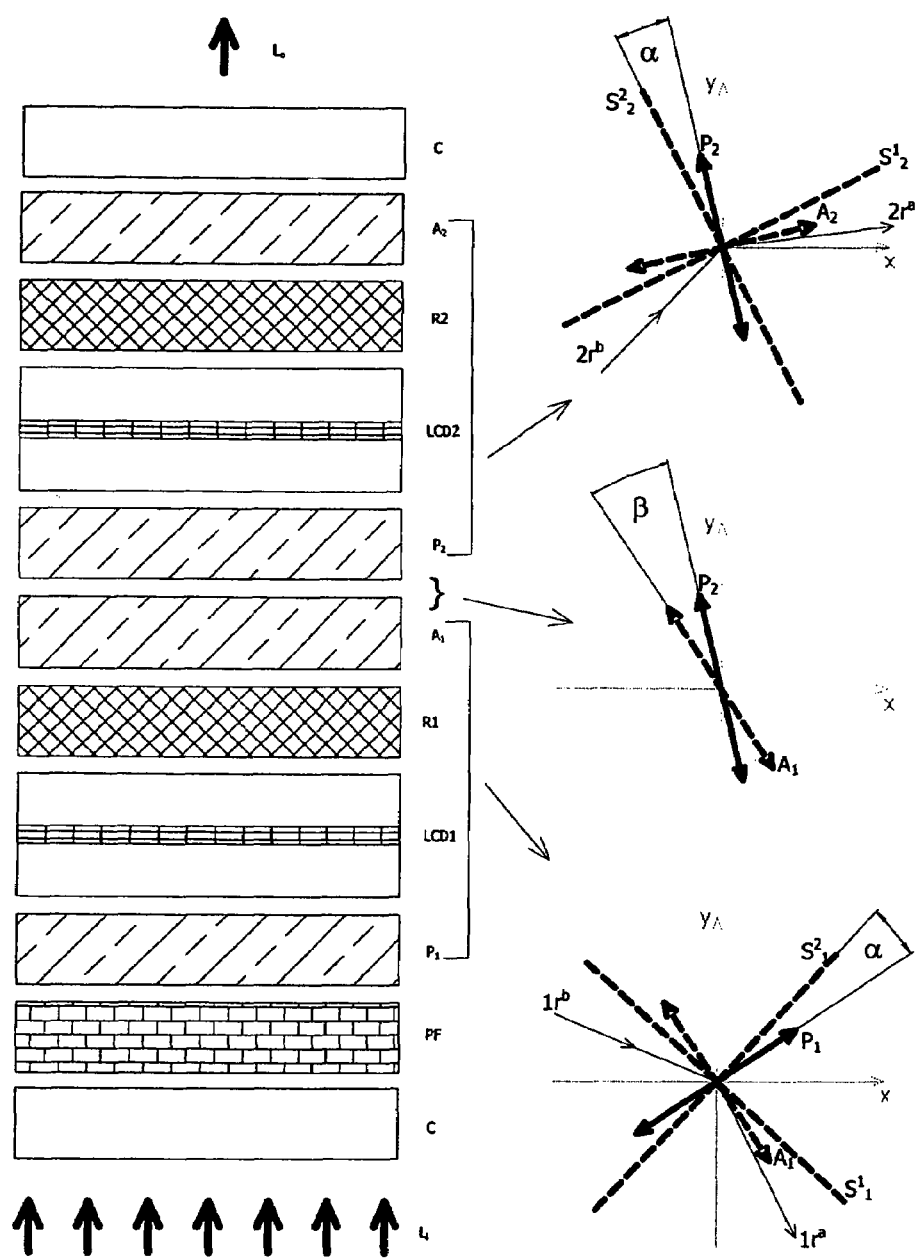
FIG. 9—Block diagram of the dual complementary LC-cell LCD protective welding light filter, showing in three separate pictures adjacent to the main block diagram the specific polarizer $P_1$, $A_1$ and LC-molecular orientation $1r^a$, $1r^b$ and the corresponding symmetry axes $S^1_1$, $S^2_1$ in the optically closed state of the first LCD cell LCD1, the specific polarizer $P_2$, $A_2$ and LC-molecular orientation $2r^a$, $2r^b$ and the corresponding symmetry axes $S^1_1$, $S^2_1$ in the optically closed state of the second LCD cell LCD2, as well as the relative orientation of the polarizers $A_1$ and $P_2$:
  a. Situation where the light input polarizers $P_1$, respectively $P_2$ are perpendicular within a small angle α to the symmetry axis $S^1_1$ respectively $S^1_2$ through the acute angle between the LC-molecular alignment directions of the first LC-cell LCD1 respectively second LC-cell LCD2
  b. Situation where the light input polarizers $P_1$, respectively $P_2$ are parallel within a small angle α to the symmetry axis $S^1_1$ respectively $S^1_2$ through the acute angle between the LC-molecular alignment directions of the first LC-cell LCD1 respectively the second LC-cell LCD2

In view of this the present state-of-the-art LCD light-switching filters allowing for variable protective shade are typically made as multilayer laminates of at least two electrically controlled optical birefringent elements—LC-cells, adequate number of mutually crossed pairs of polarizing films, adjacent to the light input and output sides of the said LC-cells and on the outer sides having protective cover glass plates, one of which having on its inner side a thin film "photopic" filter layer reflecting harmful IR an UV light (see the block diagram on the FIG. 9a or b).

The electrically controlled optical birefringent elements—LC-cells (FIG. 1), which represent the key subcomponets of the LCD light switching filter, are made according to the standard STN LCD production process, using soda-lime glass as the LC-cell boundary plates $1a^a$, $1a^b$. In order to generate the driving electric field across the LC layer $d^a+d^b+$e, the boundary glass plates $1a^a$, $1a^b$ are covered with the transparent ITO electrodes $1b^a$, $1b^b$, preferably exhibiting a surface resistivity typically 50 Ohm/square. The said electrodes are further covered with typically 50 nm thick, low residual DC voltage (RDC) polyimide like SE 4792 (Nissan). The top and the bottom polyimide alignment layers $1c^a$, $1c^b$ are then rubbed in a standard way to induce the required LC-alignment directions $1r^a$, $1r^b$ making a twist angle Φ=225° and sealed together with a perimeter seal using 4-5 μm spacers to form a LC-cell. The latter is further filled in vacuum with liquid crystal, preferably a specialized STN mixture like MLC-14000-100 (Merck). In order to stabilize the highly twisted LC-molecular orientation the said liquid crystal is doped with 0.95% of the chiral dopant like S811. The fill hole is further sealed with UV curable sealant like NOA 61 (Norland). Both LC-cells LCD1 and LCD2 are manufactured in the same way except that LC-alignment directions $2r^a$, $2r^b$ in the second LC-cell LCD2 are swapped for 90 degrees with respect to the alignment directions $1r^a$, $1r^b$ of the first LC-cell LCD1 (—complementary structure). A high contrast polarizing film $P_1$ like LLC2-5618 (Sanritz) is laminated on the light input boundary glass $1a^a$ of the LC-cell LCD1 so that its light-transmitting axis is aligned to be 6 degrees away from perpendicular direction to the symmetry axis $S^1_1$ of the LC-alignment directions of the said LC-cell LCD1. The same procedure is repeated for the polarizing film $P_2$ on the light input side of the second LC-cell LCD2 its light-transmitting axis being again aligned to be 6 degrees away from perpendicular direction to the symmetry axis $S_1^2$ of the LC-alignment directions of the said second LC-cell LCD2 (see FIG. 9a). The negative-birefringent layer R1, having its optic axis perpendicular to the LC-cell LCD1 plane, is subsequently laminated on the light output side of the boundary glass plate 1ab of the LC-cell LCD1. The same process is repeated for the negative-birefringent layer R2 laminated on the second LC-cell LCD2. The same kind of polarizing films (LLC2-5618) are further laminated as the light output polarizing films A1 and A2 on the light output sides of the negative-birefringent layers R1 respectively R2. The two assemblies of LC-cells comprising LC-cells LCD1 and LCD2 with the corresponding polarizing films $P_1$, $A_1$ respectively $P_2$, $A_2$ and negative birefringent layers R1 respectively R2 are subsequently laminated together so that the light output polarizing film $A_1$ of the first assembly and the light input polarizing film $P_2$ of the second assembly are aligned parallel to each other. Finally the whole laminate is covered with the protective glass plates C, the protective glass plate on the light input side being on the side facing the polarizing film $P_1$ covered with a multilayer photopic filter PF selectively reflecting the light in the IR and UV spectrum while transmitting the visible light.

In order to allow for optimal angular compensation of the light attenuation in the optically closed state of the above described LCD-light switching filter for personal protection in welding applications, the values of the compensating negative-birefringent layers R1 and R2 have the same optical retardation which is matched with the positive-birefringent retardation $(\Delta n_e^+ \times d_e^+)$ of the homeotropically aligned central layer e of the liquid crystal and the inherent negative-birefringent retardation $(\Delta n_p^- \times d_p^-)$ of the polarizing films $P_1$, $A_1$ and $P_2$, $A_2$ in such a way that the absolute value of the optical retardation $(\Delta n_R^- \times d_R^-)$ of the optical compensating layers R1 (=R2) is 200 nm smaller than the difference of the absolute values of the retardation of the homeotropically aligned central layer e of the liquid crystal $(\Delta n_e^+ \times d_e^+)$ and the inherent retardation $(\Delta n_p^- \times d_p^-)$ of the polarizing films $P_1$, $A_1$ and $P_2$, $A_2$ (for detailed definitions and notations see paragraph #2, in particularly 2.2 and 2.3 of the Detailed description):

$$|(\Delta n_e^+ \times d_e^+)| - (\Delta n_p^- \times d_p^-)| = |(\Delta n_R^- \times d_R^-)| + 200 \text{ nm}.$$

As described in detail in the paragraph #2, the resulting effective positive birefringence (200 nm) with the optic axis perpendicular to the LCD light switching filter plane together with the in-plane effective residual retardation of the boundary layers $d^a$, $d^b$ of the LC-molecular layer allow for very efficient overall angular compensation of the light attenuation of the LCD light switching filter in the optically closed state.

Figure 8A:
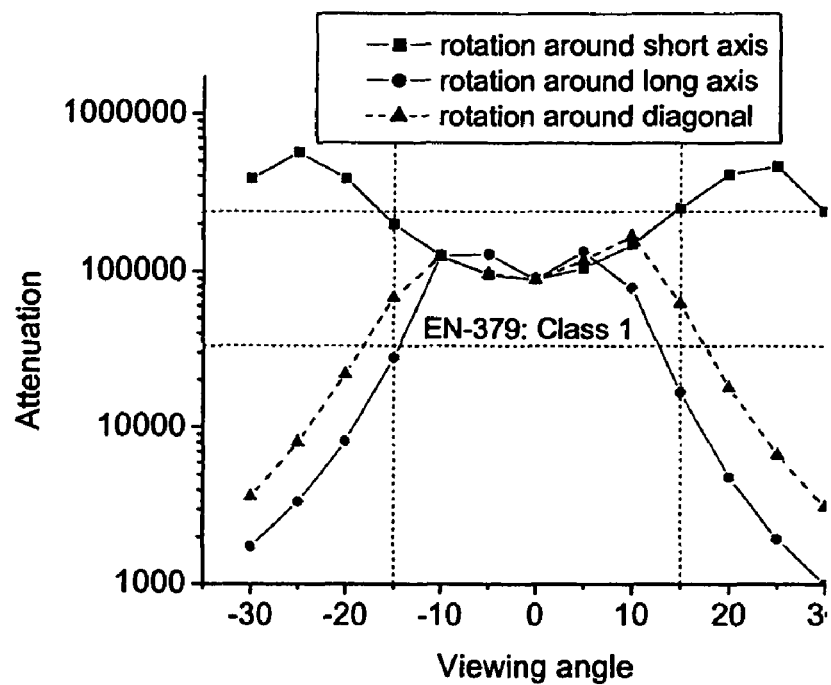
Figure 8B:
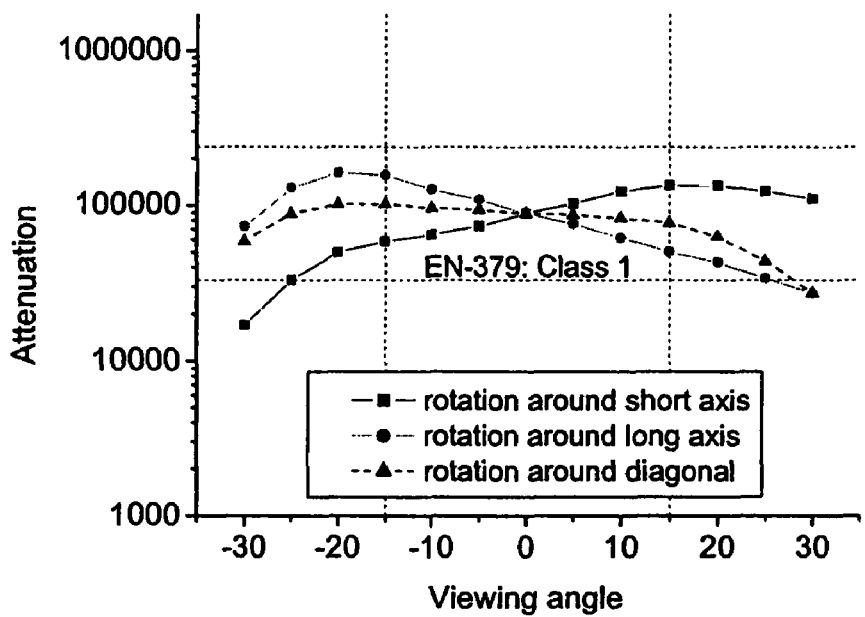

The measurements of the angular dependence of the light attenuation of the LCD light switching manufactured according to the above Example (b) compared to the standard dual complementary TN LCD cell (a) are shown on the FIG. 8. The scale on the figure is drawn according to the EN 379 regulation—horizontal lines represent the limits of the "quality class I and all the regulations are specified for the light incident angles within +/−15 degrees. It is obvious that the results for the dual HTLS LC-cell light switching filter are an order of magnitude better than with the present state-of-the-art products.

It should be however emphasized, that the described Example represents only one feasible working embodiment of the angularly compensated LCD welding filter according to the invention. Various modifications and variations can be made within the scope of this invention, especially in the choice of relative orientation of the polarizing films and the LC-molecular alignment as well as complementary LC-cell construction allowing adapting to the requirements of specific applications.

Figure 9B:
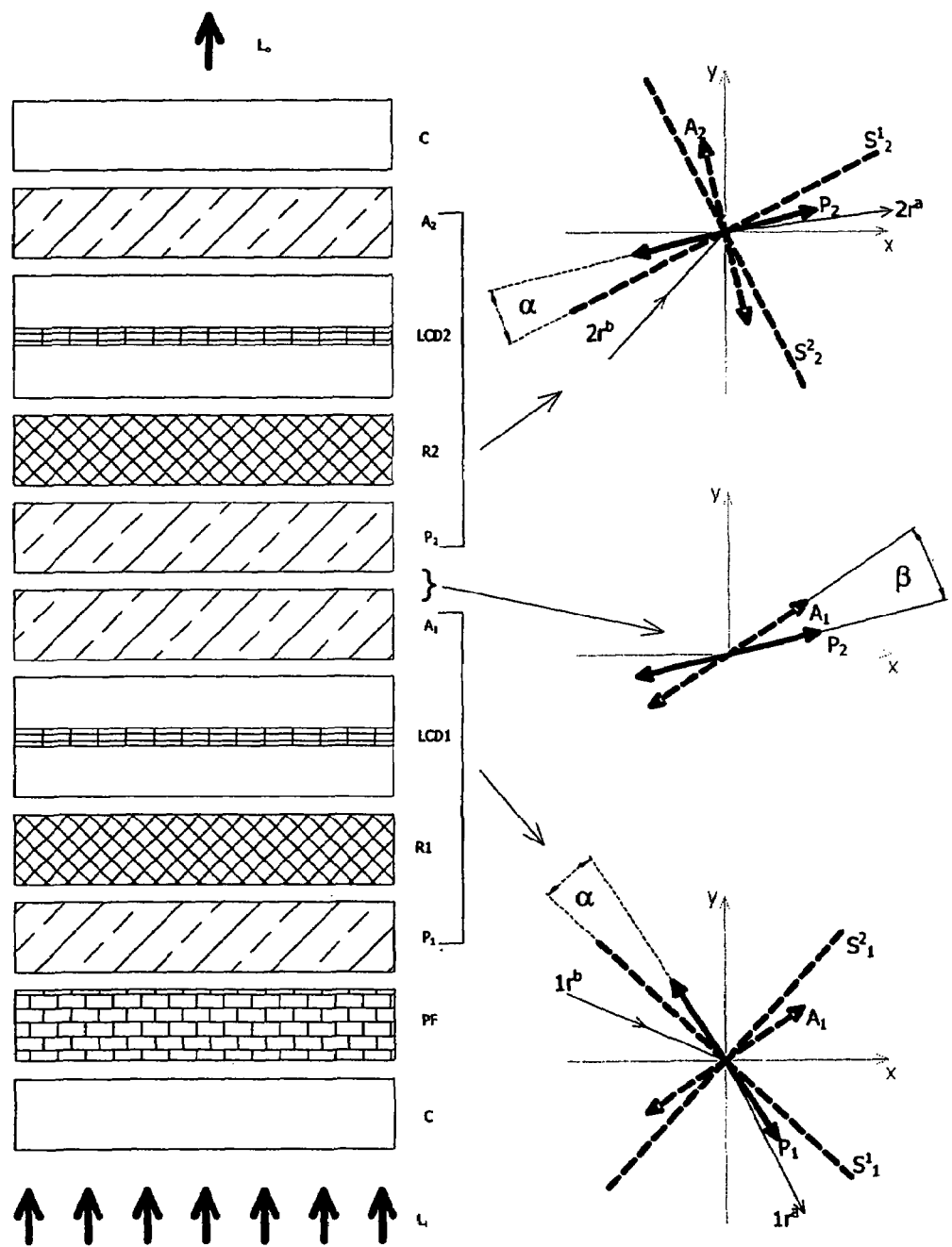

A typical example of a possible modification is shown on the FIG. 9b, where the polarization (P1, P2) of the incoming light is parallel to the symmetry axes $S^1_1$ respectively $S^1_2$ of the LC-molecular orientation in the LC-cells LCD1, respectively LCD2 and not perpendicular, as assumed in the EXAMPLE. Such a change of the relative polarization direction with respect to the symmetry axes $S^1_1$ respectively $S^1_2$ of the LC-molecular orientation results in the "shift" of the retardation layers R1, respectively R2 from the light output sides of the LC-cells LCD1 respectively LCD2, to the light input positions.

The invention claimed is:

1. High contrast, wide viewing angle LCD light switching filter comprising two electrically controlled LC-cells (LCD1, LCD2), two mutually crossed pairs of polarizing films ($P_1$, $A_1$ and $P_2$, $A_2$), adjacent to light input and output sides of the said LC cells (LCD1, LCD2), each of the said LC-cells (LCD1, LCD2) having a thin liquid crystal molecular layer ($d^a + d^b + e$) of highly twisted liquid crystal enclosed between two boundary glass plates ($1a^a$, $1a^b$), the said plates ($1a^a$, $1a^b$) being on an inner side covered by transparent electrodes ($1b^a$, $1b^b$) and alignment layers ($1c^a$, $1c^b$), characterized in
  that the alignment layers ($1c^a$, $1c^b$) on the transparent electrodes ($1b^a$, $1b^b$) covering the boundary glass plates ($1a^a$, $1a^b$) of both LC cells (LCD1, LCD2) are oriented in such a way that in an optically open state of the LCD light switching filter, when no driving electric voltage (V=0) is applied to the transparent electrodes ($1b^a$, $1b^b$), the liquid crystal molecular layer ($d^a + d^b + e$) adopts a highly twisted molecular orientation with twist angles $\Phi$ between 120° to 240° and that
  the two crossed pairs of polarizing films ($P_1$, $A_1$ and $P_2$, $A_2$) are oriented with respect to LC molecular alignment surface directions ($1r^a$, $1r^b$ respectively $2r^a$, $2r^b$) of each of the LC cells (LCD1, LCD2) in such a way that the light transmission axes of a first ($P_1$, $A_1$) of said pairs of polarizing films are aligned within a small angle $\alpha$ along symmetry axes ($S^1_1$, $S^2_1$) of the LC-molecular alignment surface directions ($1r^a$, $1r^b$) in a first LC-cell (LCD1) and that the light transmission axes of a second ($P_2$, $A_2$) of said pairs of polarizing films are aligned within a small angle $\alpha$ along symmetry axes ($S^1_2$, $S^2_2$) of the LC-molecular alignment surface directions ($2r^a$, $2r^b$) in a second LC-cell (LCD2), wherein said angle $\alpha$ is smaller than 20 degrees, allowing for the expansion of an overall viewing angle of the LCD light switching filter.

2. High contrast, wide viewing angle LCD light switching filter according to claim 1, characterized in that the LC-cells (LCD1, LCD2) provide a light transmission/driving voltage characteristics of high transmission at driving voltages lower than a threshold voltage $V_{th}$, followed by a steep decay to low transmission with increasing driving voltages as a first regime and a further less inclined decay of transmission beginning at a limiting driving voltage $V_{LS}$ with further increasing driving voltages as a second, "low-slope" regime (LS) and that the LCD light switching filter is adapted to be operated in the second regime of the light transmission/driving voltage characteristics of the LC-cells (LCD1, LCD2) in an "optically-closed" state, wherein the light attenuation is varied only within the second regime being always greater than 10.

3. High contrast, wide viewing angle LCD light switching filter according to claim 1 or 2, characterized in that the twist angle Φ of the molecular orientation is selected to be different from 180 degrees by an angle +/−δ, where δ can adopt any value in the interval from 10 degrees to 60 degrees.

4. High contrast, wide viewing angle LCD light switching filter according to claim 1 or 2, characterized in that the twist angle Φ of the molecular orientation is selected to be close to the value 180+/−45 degrees.

5. High contrast, wide viewing angle LCD light switching filter according to claim 1 or 2, characterized in that
the said angle α between the said first pair of crossed polarizing films (P$_1$, A$_1$) and the said symmetry axes (S$^1_1$, S$^2_1$) in said first LC-cell (LCD1) and between the said second pair of crossed polarizing films (P$_2$, A$_2$) and the said symmetry axes (S$^1_2$, S$^2_2$) in said second LC-cell (LCD2) is adjusted to maximize the overall viewing angle, while keeping the light attenuation within a cone of +/−15 degrees around the normal to the LCD light switching filter such that even at a maximum light attenuation of 100.000 the said light attenuation varies less than for a factor 1.6 around the average value within the said 15 degree cone angle and that
the transmission axis of a light output polarizing film (A$_1$) of said first (P$_1$, A$_1$) of said pairs of polarizing films of the first LC-cell (LCD1) is aligned to be parallel within a small angle β to the transmission axis of a light input polarizing film (P$_2$) of said second (P$_2$, A$_2$) of said pairs of polarizing films of the second LC-cell (LCD2) and that the said angle β is smaller than 20 degrees.

6. High contrast, wide viewing angle LCD light switching filter according to claim 1 or 2, characterized in
that a concentration of a chiral dopant in the said liquid crystal molecular layer (d$^a$+d$^b$+e) is selected to optimize the slope of the light transmission vs. voltage characteristics in the said second regime (LS), wherein
said concentration of the said chiral dopant is in the range between concentrations causing 5% and concentrations causing 120% of the twist angle Φ of the molecular orientation within the said liquid crystal molecular layer (d$^a$+d$^b$+e), when no driving voltage (V) is applied to it.

7. High contrast, wide viewing angle LCD light switching filter according to claim 1 or 2, characterized in that the said two LC-cells (LCD1, LCD2) have a complementary configuration, in which all technical parameters are identical except for the liquid crystal molecular alignment directions (2r$^a$, 2r$^b$) of the second LC-cell (LCD2), which are swapped for 90 degrees with respect to the first LC-cell (LCD1), so that the symmetry axis (S$^1_2$) through an acute angle between the molecular alignment directions (2r$^a$, 2r$^b$) of the second LC-cell (LCD2) is perpendicular to the symmetry axis (S$^1_1$) through an acute angle between the molecular alignment directions (1r$^a$, 1r$^b$) of the first LC-cell (LCD1).

8. High contrast, wide viewing angle LCD light switching filter according to claim 1 or 2, characterized in that
it has a built in negative-birefringent layer (R1) between the either one of the said boundary glass plates (1a$^a$, 1a$^b$) of the first LC-cell (LCD1) and the adjacent polarizing film (P$_1$) or (A$_1$) of said first (P$_1$, A$_1$) of said pairs of polarizing films and a negative-birefringent layer (R2) between the either one of the said boundary glass plates (2a$^a$, 2a$^b$) of the second LC-cell (LCD2) and the adjacent polarizing film (P$_2$) or (A2) of said second (P$_2$, A$_2$) of said pairs of polarizing films and
the said negative-birefringent layers (R1, R2), an optical axis of which is perpendicular to a LCD light switching filter plane, exhibit the same negative optical retardation $\Delta n_R^- \times d_R^-$, where $\Delta n_R^-$ is the difference between the refractive indices of the ordinary and extraordinary light ray in the said negative-birefringent layers (R1, R2) and $d_R^-$ is the thickness of the said negative-birefringent layers (R1, R2), and that an absolute value of a negative optical retardation $\Delta n_R^- \times d_R^-$ of the said negative-birefringent layers (R1, R2) is selected to be equal to the difference between an absolute value of a positive optical retardation $\Delta n_e^+ \times d_e^+$ of a homeotropically aligned part of the liquid crystal molecular layer (e) in said LC-cells (LCD1, LCD2) and an absolute value of a negative optical retardation $\Delta n_p^- \times d_p^-$ of the said pairs of polarizing films (P$_1$, A$_1$, P$_2$, A$_2$), where
$\Delta n_e^+$ is the difference between the refractive indices of the ordinary and extraordinary light ray in the said homeotropically aligned part of the liquid crystal molecular layer (e), ($d_e^+$) is the thickness of a said homeotropically aligned liquid crystal molecular layer (e) and $\Delta n_p^-$ is the difference between the refractive indices of the ordinary and extraordinary light ray in the polarizing films (P$_1$, A$_1$, P$_2$, A$_2$) while $d_p^-$ is the thickness of the said polarizing films (P$_1$, A$_1$, P$_2$, A$_2$).

9. High contrast, wide viewing angle LCD light switching filter according to claim 1 or 2, characterized in that
a light input polarizing film (P$_1$) of a first (P$_1$, A$_1$) of said pairs of polarizing films for the first LC-cell (LCD1) is parallel within a small angle α to the symmetry axis (S$^1_1$) through an acute angle between the LC molecular alignment directions (1r$^a$, 1r$^b$) of the first LC-cell (LCD1) and a light input polarizing film (P$_2$) of a second (P$_2$, A$_2$) of said pairs of polarizing films for the second LC-cell (LCD2) is parallel within a small angle α to the symmetry axis (S$^1_2$) through an acute angle between the liquid crystal molecular alignment directions (2r$^a$, 2r$^b$) of the second LC-cell (LCD2), the said angle α being smaller than 20 degrees and that
the said LCD light switching filter has a built in negative-birefringent layer (R1) between the light input boundary glass plate (1a$^a$) of the first LC-cell (LCD1) and the adjacent light input polarizing film (P$_1$) and a negative-birefringent layer (R2) between the light input boundary glass plate (1a$^a_2$) of the second LC-cell (LCD2) and the adjacent light input polarizing film (P$_2$) and that
both said negative-birefringent layers (R1, R2), optical axes of which are perpendicular to a LCD light switching filter plane, exhibit the same negative optical retardation $\Delta n_R^- \times d_R^-$, where $\Delta n_R^-$ is the difference between the refractive indices of the ordinary and extraordinary light ray in the said negative-birefringent layers (R1, R2) and $d_R^-$ is the thickness of the said negative-birefringent layers (R1, R2), and that an absolute value of a negative optical retardation $\Delta n_R^- \times d_R^-$ of said negative-birefringent layers (R1, R2) is selected to be smaller than the difference between an absolute value of a positive optical retardation $\Delta n_e^+ \times d_e^+$ of a homeotropically aligned part of the liquid crystal molecular layer (e) in the LC-cells (LCD1, LCD2) and an absolute value of a negative optical retardation $\Delta n_p^- \times d_p^-$ of the said pairs of polarizing films ($P_1, A_1, P_2, A_2$) so that a resulting positive optical retardation $(\Delta n_e^+ \times d_e^+) - (\Delta n_n^- \times d_p^-) - (\Delta n_R^- \times d_R^-)$ in the direction of the normal to the LCD light switching filter, in combination with an in-plane residual positive optical retardation of boundary parts of the liquid crystal molecular layer ($d^a$, $d^b$) in both LC-cells (LCD1, LCD2) allows for rather efficient additional compensation of the angular dependence of the pairs of crossed polarizing films ($P_1, A_1$ and $P_2, A_2$), where $\Delta n_e^+$ is the difference between the refractive indices of the ordinary and extraordinary light ray in the said homeotropically aligned part of the liquid crystal molecular layer (e), $d_e^+$ is the thickness of said homeotropically aligned part of the liquid crystal molecular layer (e) and $\Delta n_p^-$ is the difference between the refractive indices of the ordinary and extraordinary light ray in the polarizing films ($P_1, A_1, P_2, A_2$) while $d_p^-$ is the thickness of the said polarizing films ($P_1, A_1, P_2, A_2$).

10. High contrast, wide viewing angle LCD light switching filter according to claim 1 or 2, characterized in that a light input polarizing film ($P_1$) of a first ($P_1, A_1$) of said pairs of polarizing films for the first LC-cell (LCD 1) is perpendicular within a small angle $\alpha$ to the symmetry axis ($S^1_1$) through an acute angle between the LC molecular alignment directions ($1r^a, 1r^b$) of the first LC-cell (LCD1) and a light input polarizing film ($P_2$) of a second ($P_2, A_2$) of said pairs of polarizing films for the second LC-cell (LCD2) is perpendicular within a small angle $\alpha$ to the symmetry axis ($S^1_2$) through an acute angle between the liquid crystal molecular alignment directions ($2r^a, 2r^b$) of the second LC-cell (LCD2), the said angle $\alpha$ being smaller than 20 degrees and that the said LCD light switching filter has a built in negative-birefringent layer (R1) between the light output boundary glass plate ($1a^b$) of the first LC-cell (LCD1) and the adjacent light output polarizing film ($A_1$) and a negative-birefringent layer (R2) between the light output boundary glass plate ($2a^b$) of the second LC-cell (LCD2) and the adjacent light output polarizing film ($A_2$) and that both said negative-birefringent layers (R1, R2), optic axes of which are perpendicular to a LCD light switching filter plane, exhibit the same negative optical retardation $\Delta n_R^- \times d_R^-$, where $\Delta n_R^-$ is the difference between the refractive indices of the ordinary and extraordinary light ray in the said negative-birefringent layers (R1, R2) and $d_R^-$ is the thickness of the said negative-birefringent layers (R1, R2), and that an absolute value of the negative optical retardation $\Delta n_R^- \times d_R^-$ of said negative-birefringent layers (R1, R2) is selected to be smaller than the difference between an absolute value of a positive optical retardation $\Delta n_e^+ \times d_e^+$ of a homeotropically aligned part of the liquid crystal molecular layer (e) in the LC-cells (LCD1, LCD2) and an absolute value of a negative optical retardation $\Delta n_p^- \times d_p^-$ of the said pairs of polarizing films ($P_1, A_1, P_2, A_2$) so that a resulting positive optical retardation $(\Delta n_e^+ \times d_e^+) - (\Delta n_p^- \times d_p^-) - (\Delta n_R^- \times d_R^-)$ in the direction of the normal to the LCD light switching filter, in combination with an in-plane residual positive optical retardation of boundary parts of the liquid crystal molecular layer ($d^a, d^b$) in both LC-cells (LCD1, LCD2) allows for rather efficient additional compensation of an angular dependence of the pairs of crossed polarizing films ($P_1, A_1$ and $P_2, A_2$), where $\Delta n_e^+$ is the difference between the refractive indices of the ordinary and extraordinary light ray in the homeotropically aligned part of the liquid crystal molecular layer (e), $d_e^+$ is the thickness of said homeotropically aligned part of the liquid crystal molecular layer (e) and $\Delta n_p^-$ is the difference between the refractive indices of the ordinary and extraordinary light ray in the polarizing films ($P_1, A_1, P_2, A_2$) while $d_p^-$ is the thickness of the said polarizing films ($P_1, A_1, P_2, A_2$).

11. High contrast, wide viewing angle LCD light switching filter according to claim 9, characterized in that the thickness $d_R^-$ of the said negative-birefringent layers (R1, R2) is selected to be such that the absolute value of their negative optical retardation $\Delta n_R^- \times d_R^-$ is at least 100 nm but not more than 250 nm smaller than the difference between the absolute value of the positive optical retardation $\Delta n_e^+ \times d_e^+$ of the homeotropically aligned part of the liquid crystal molecular layer (e) in the LC-cells (LCD1, LCD2) and an absolute value of the negative optical retardation $\Delta n_p^- \times d_p^-$ of the said pairs of polarizing films ($P_1, A_1, P_2, A_2$).

12. High contrast, wide viewing angle LCD light switching filter according to claim 10 characterized in that the thickness $d_R^-$ of the said negative-birefringent layers (R1, R2) is selected to be such that the absolute value of their negative optical retardation $\Delta n_R^- \times d_R^-$ is at least 100 nm but not more than 250 nm smaller than the difference between the absolute value of the positive optical retardation $\Delta n_e \times d_e^+$ of the homeotropically aligned part of the liquid crystal molecular layer (e) in the LC-cells (LCD1, LCD2) and an absolute value of the negative optical retardation $\Delta n_p^- \times d_p^-$ of the said pairs of polarizing films ($P_1, A_1, P_2, A_2$).

* * * * *

UNITED STATES PATENT AND TRADEMARK OFFICE
CERTIFICATE OF CORRECTION

PATENT NO.        : 8,026,998 B2
APPLICATION NO.   : 11/920323
DATED             : September 27, 2011
INVENTOR(S)       : Pirs et al.

It is certified that error appears in the above-identified patent and that said Letters Patent is hereby corrected as shown below:

In Column 19, line 7 (Claim 9, line 38) the equation "$(\Delta n_n^- \times d_p^-)$" should read -- $(\Delta n_p^- \times d_p^-)$ --; and In Column 20, line 44 (Claim 12, line 7) the equation "$\Delta n_e \times d_e^+$" should read -- $\Delta n_e^+ \times d_e^+$ --.

Signed and Sealed this
Thirty-first Day of January, 2012

David J. Kappos
*Director of the United States Patent and Trademark Office*